United States Patent [19]

Ushikoshi

[11] Patent Number: 5,552,682
[45] Date of Patent: Sep. 3, 1996

[54] DEVICE FOR DETECTING ROTATIONAL POSITION OF BRUSHLESS MOTOR

[75] Inventor: Isao Ushikoshi, Komagane, Japan

[73] Assignee: Sankyo Seiki Mfg. Co., Ltd., Nagano-ken, Japan

[21] Appl. No.: 356,362

[22] PCT Filed: Apr. 25, 1994

[86] PCT No.: PCT/JP94/00678

§ 371 Date: Mar. 6, 1995

§ 102(e) Date: Mar. 6, 1995

[87] PCT Pub. No.: WO94/26022

PCT Pub. Date: Nov. 10, 1994

[30] Foreign Application Priority Data

Apr. 27, 1993 [JP] Japan ................................. 5-123576

[51] Int. Cl.$^6$ ............................................. H02P 6/16
[52] U.S. Cl. ............................................ 318/254; 318/439
[58] Field of Search ............................. 318/138, 254, 318/439

[56] References Cited

U.S. PATENT DOCUMENTS

| | | | |
|---|---|---|---|
| 4,529,918 | 7/1985 | Müller | 318/254 |
| 4,740,733 | 4/1988 | Epars | 318/254 |
| 5,160,873 | 11/1992 | Tukiyama et al. | 318/254 |
| 5,291,104 | 3/1994 | Okada et al. | 318/254 |

FOREIGN PATENT DOCUMENTS

| | | |
|---|---|---|
| 57-40390 | 3/1982 | Japan. |
| 57-49386 | 3/1982 | Japan. |
| 61-120916 | 6/1986 | Japan. |

*Primary Examiner*—Bentsu Ro
*Attorney, Agent, or Firm*—McAulay Fisher Nissen Goldberg & Kiel, LLP

[57] ABSTRACT

A signal of one pulse per turn of a motor is obtained by using an m-phase driving coil (L) to be reciprocally electrified in positive and negative directions; a driving magnet which faces the driving coil (L), whose driving magnetic poles S and N are alternately polarized, and which rotates together with a rotary shaft; homopolar position detecting magnetic element (N+) formed on at least one of the driving magnetic poles (N and S); magnetic detectors arranged so as to face the driving magnet to detect the magnetic fields of both the driving magnetic poles (N and S) and the position detecting magnetic element (N+); a brushless-motor driving circuit for supplying a driving current to the driving coil (L) in accordance with signals provided from magnetic detectors; and a synthesizing element for synthesizing a rotational position signal from signals provided from the magnetic detectors, a counter electromotive voltage waveform of the driving coil (L), and a reference voltage (COM). Therefore, the component cost can be decreased because the existing PG sensor and PG magnet are unnecessary, and also the manufacturing cost can be decreased because it is unnecessary to install the PG magnet and mount the PG sensor on a board. Moreover, the board can be downsized because space for the PG sensor and PG-sensor wiring space is unnecessary.

4 Claims, 6 Drawing Sheets

DEVICE FOR DETECTING ROTATIONAL POSITION OF BRUSHLESS MOTOR

BACKGROUND OF THE INVENTION a) Field of the Invention

The present invention relates to a detector for detecting the position of the rotor of a brushless motor.

b) Description of the Related Art

An existing drum driving motor (brushless motor) of a VTR (Video Tape Recorder), for instance, has a rotational position detector for generating a rotational position signal of one pulse per turn of the motor in order to change image heads.

FIG. 6 shows an example of the rotational position detector in which a rotational position detecting step of a motor is formed by the fact that a magnetic field generated by a PG (Pulse Generator) magnet 21a set on the outer periphery of a rotor 21 of the motor is detected by a PG sensor 22 arranged at a position facing the outer periphery of the rotor 21, a signal provided as an output from PG sensor 22 is amplified by an amplifier 23 to obtain a waveform having a peak shown in FIG. 7(a), and the signal is compared with a threshold $V_{th}$ by a voltage comparison circuit 24 to obtain a pulse signal whose one cycle corresponds to one turn of rotor 21 as shown in FIG. 7(b).

However, the rotational position detector of the above brushless motor has the following problems.

That is, the number of parts increases and therefore the cost increases because the rotational position detector of the brushless motor requires the above-mentioned PG magnet 21a and the PG sensor 22.

Moreover, when a magnetic detector such as PG sensor 22 is used, electric wiring is necessary on a board (printed circuit board) and the operation is complicated. Further, the board cannot be downsized because the magnetic detector is arranged at a position facing the outer periphery of the rotor magnet 21 and a large space for electric wiring is necessary on the board.

OBJECT AND SUMMARY OF THE INVENTION

The present invention is made to solve the above problems of the prior art and its primary object is to provide a rotational position detector of a brushless motor which makes it possible to decrease the number of components and thereby decrease the component cost. Further, the manufacturing cost can be decreased and a corresponding board downsized as a result of the invention.

To achieve the above object, a first aspect of the present invention comprises an m-phase driving coil which is reciprocally electrified in the positive and negative directions, a driving magnet which faces the driving coil and rotates together with a rotary shaft by the fact that N and S driving magnetic poles are alternately polarized, position-detecting magnetic means which is provided on at least one of the driving magnetic poles and has homopolarity, a magnetic detector which is arranged so as to face the driving magnet and detects the magnetic fields of both the driving magnetic poles and position detecting means, a brushless motor driving circuit for applying a driving current to the driving coil in accordance with an output signal of the magnetic detector, and synthesizing means for synthesizing a rotational position signal with an output signal of the magnetic detector, a counter electromotive voltage of the driving coil and a reference voltage.

A second aspect of the present invention provides that an output of the magnetic detector of the first aspect described above protrusively changes once per turn of a motor.

A third aspect of the present invention provides that the synthesizing means of the first aspect of the invention comprises an amplifier for amplifying output signals for one phase among those of a magnetic detector, a counter electromotive synthesizing circuit for providing a predetermined pulse signal as an output in accordance with a counter electromotive voltage waveform of a driving coil and a reference voltage, a sample-and-hold circuit for sampling and holding an output signal of an amplifier in accordance with a pulse signal sent from a counter electromotive synthesizing circuit, a potential dividing circuit for dividing the amplitude of the potential of an output signal of the amplifier by n, a comparator for comparing the voltage of an output signal of the sample-and-hold circuit with that of an output signal of the potential dividing circuit, and an AND circuit for computing the logical product between output signals of the comparator and the counter electromotive synthesizing circuit and providing it as a rotational position detection signal output.

The fourth aspect of the present invention provides that the synthesizing means of the first aspect of the invention comprises an amplifier for amplifying output signals for one phase among those of a magnetic detector, a counter electromotive synthesizing circuit for providing a predetermined pulse signal as an output in accordance with a counter electromotive voltage waveform of a driving coil and a reference voltage, a Hall output synthesizing circuit for comparing and synthesizing output signals sent from a magnetic detector and providing a predetermined pulse signal as an output, an OR circuit for computing the logical sum between output signals of the Hall output synthesizing circuit and the counter electromotive synthesizing circuit, a sample-and-hold circuit for sampling and holding an output signal of the amplifier in accordance with a pulse signal sent from the OR circuit, a potential dividing circuit for dividing the amplitude of an output signal of the amplifier by n, a comparator for comparing the voltage of an output signal of the sample-and-hold circuit with that of an output signal of the potential dividing circuit, and an AND circuit for computing the logical product between output signals of the comparator and the Hall output synthesizing circuit and providing it as a rotational position detection signal output.

In the case of the first, third, and fourth aspects of the invention, a driving magnetic detector is also used as a position-detecting magnetic detector and a pulse signal per turn of a motor is obtained as a rotational position signal from synthesizing means in accordance with an output signal of the magnetic detector, a counter electromotive voltage waveform of a driving coil, and a reference voltage.

In the case of the second aspect of the invention, an output of a magnetic detector protrusively changes once per turn of a motor and a pulse of a rotational position signal is obtained by synthesizing means from the protruded portion.

Therefore, the present invention makes it possible to decrease the component cost because the number of existing components including a PG sensor and a PG magnet and also to decrease the manufacturing cost because it is unnecessary to install the PG magnet and mount the PG sensor on a board. The board, moreover, may be downsized because space for the PG sensor and PG-sensor wiring space is unnecessary.

For a better understanding of the present invention, reference is made to the following description and accompanying drawings while the scope of the invention will be pointed out in the appended claims.

BRIEF DESCRIPTION OF THE DRAWINGS

In the drawings:

FIGS. 5(A), 5(S), 5(C), 5(T1), 5(T2), 5(B'), 5(C1), 5(D'), 5(Y), and 5(H) are timing charts for explaining the circuit operations of FIG. 4;

DESCRIPTION OF THE PREFERRED EMBODIMENTS

Embodiments of the present invention are described below by referring to the accompanying drawings.

Figure 1:
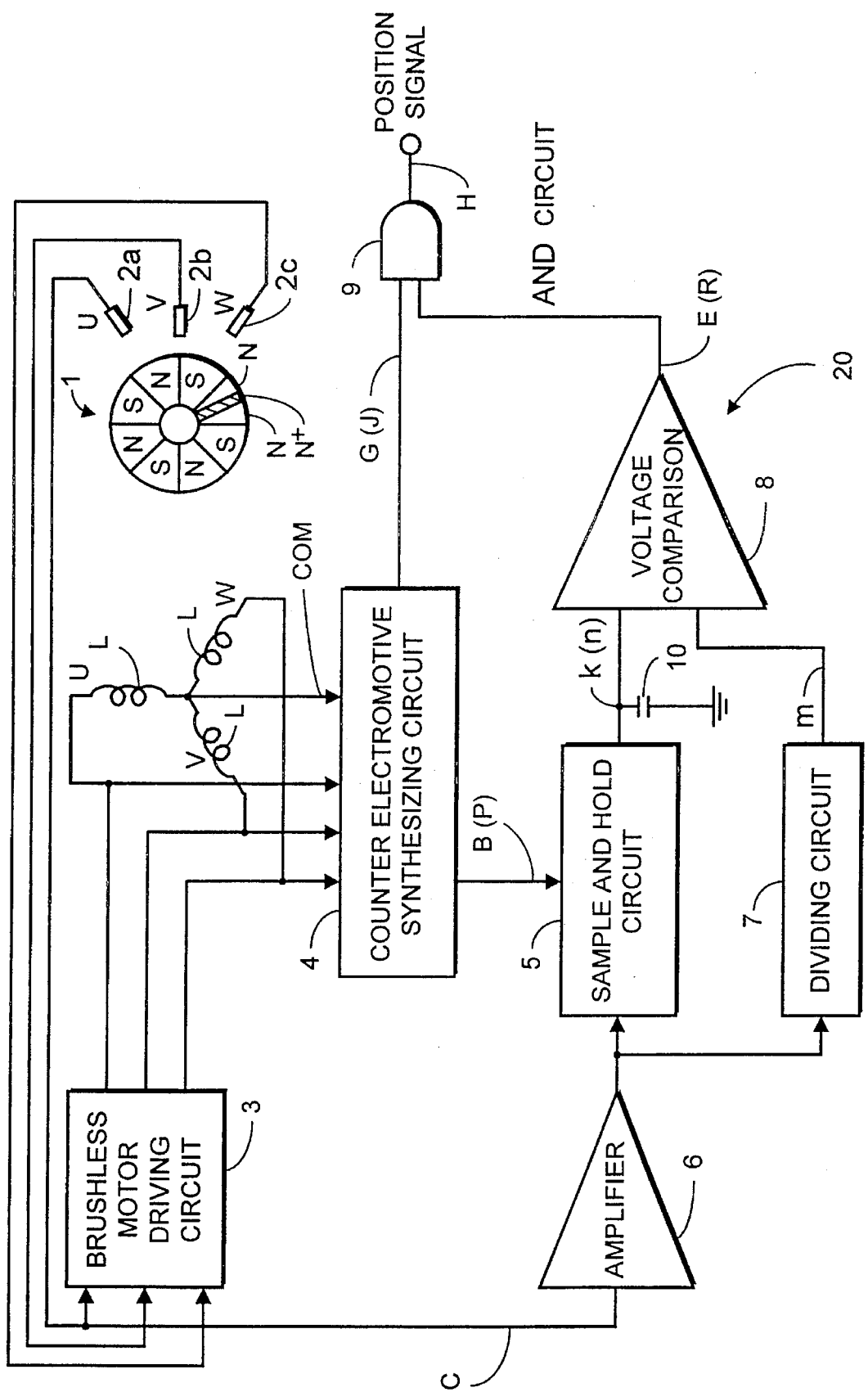
FIG. 1 is a typical diagram of a brushless-motor rotational position detector showing an embodiment of the present invention.

FIG. 1 is a typical diagram of a brushless-motor rotational position detector showing an embodiment of the present invention. This embodiment uses a three-phase brushless motor.

In FIG. 1, symbol 1 represents a driving magnet. Driving magnet 1 is set to a rotary shaft (not shown) rotatably supported by a circuit board (not shown) so as to rotate together with the rotary shaft. Driving magnet 1 has driving magnetic poles N and S which are alternately polarized in the circumferential direction and in one of the driving magnetic poles, N, a position detecting magnetic pole N+ which serves as position detecting magnetic means is polarized. The position detecting magnetic pole N+ is polarized at a magnetic flux density higher than that of the peripheral driving magnetic poles N. Hall elements 2a, 2b, and 2c serving as magnetic detectors for detecting the magnetic fields of the driving magnetic poles N and S and the position detecting magnetic pole N+ are set to a position facing driving magnet 1 on a circuit board in the axial direction respectively. Each output terminal of Hall elements 2a, 2b, and 2c connects with a driving IC (integrated circuit) provided on the circuit board.

The driving IC comprises a brushless-motor driving circuit 3 for supplying a driving current to a driving coil L in accordance with the signals provided as outputs from Hall elements 2a, 2b, and 2c, an amplifier 6 connected to one (phase U in this embodiment) of the output terminals of Hall elements 2a, 2b, and 2c to amplify the output signal of the element, a counter electromotive synthesizing circuit 4 for detecting a counter electromotive waveform induced when the driving coil L is electrified and the middle-point voltage of the coil L provides as an output a predetermined pulse signal, a sample-and-hold circuit 5 connected to the counter electromotive synthesizing circuit 4 and the output terminal of amplifier 6, a potential dividing circuit 7 for dividing the amplitude of a potential appearing on the output terminal of amplifier 6 by n, a comparator 8 whose one end is connected to output terminal of potential dividing circuit 7 and whose other end is connected to the output terminal of sample-and-hold circuit 5 to compare the voltage of a signal provided as an output from potential dividing circuit 7 with that of a signal provided as an output from sample-and-hold circuit 5, and an AND gate 9 whose one end is connected to the output terminal of comparator 8 and whose other end is connected to the output terminal of counter electromotive synthesizing circuit 5 to compute the logical product between output signals of circuit 5 and comparator 8 and synthesizing means 20 for generating a rotational position signal by synthesizing which comprises amplifier 6, counter electromotive synthesizing circuit 4, sample-and-hold circuit 5, potential dividing circuit 7, comparator 8, and AND gate 9.

In FIG. 1, symbol 10 represents a capacitor.

In FIG. 1, to simplify the drawing, Hall elements 2a, 2b, and 2c are drawn at positions facing the outer periphery of driving magnet 1 and coil L is drawn outside driving magnet 1. In fact, however, Hall elements 2a, 2b, and 2c are arranged at positions facing the driving magnetic poles N and S of driving magnet 1 on the circuit board in the axial direction and the coil L is set to a position facing the inner periphery of driving magnet 1.

The following is the description of the operations of the brushless-motor rotational position detector thus constituted. English characters in FIG. 1 correspond to those showing waveforms in FIG. 2 respectively.

When a predetermined voltage is applied to the driving coil L, driving magnet 1 rotates, the poles N and S of driving magnet 1 alternately face Hall elements 2a, 2b, and 2c, and a sinusoidal waveform is provided as an output from Hall element 2a, 2b, or 2c correspondingly to the direction of the magnetic field of each pole. Because driving magnet 1 is provided with the position detecting polarization N+ as described above, the Hall outputs of phases U. V, and W serve as sinusoidal waveforms having a peak once per turn as shown in FIG. 2(C). Among these outputs, the Hall output u is amplified by amplifier 6 and provided as an input to sample-and-hold circuit 5 and potential dividing circuit 7 respectively.

The sinusoidal outputs provided from Hall elements 2a, 2b, and 2c are provided as inputs to brushless motor driving circuit 3, a driving current is supplied to driving coil L in accordance with these input signals, and driving magnet 1 rotates.

The counter electromotive waveforms U. V, and W induced in this case and the middle-point voltage COM of coil L are supplied to counter electromotive synthesizing circuit 4. In counter electromotive synthesizing circuit 4, the counter electromotive waveform U shown in FIG. 2(A) whose phase deviates by approximately +30° in electrical angle from the Hall output u and the coil middle-point voltage COM serving as a reference voltage are compared and synthesized and thus a pulsating sample-and-hold signal shown in FIG. 2(B) is provided as an output.

Moreover, in counter electromotive synthesizing circuit 4, a counter electromotive waveform whose phase deviates by approximately +90° in electrical angle from Hall output u, that is, −V shown in FIG. 2(F) and the coil middle-point voltage COM are compared and synthesized and a pulse signal shown in FIG. 2(G) is provided as an output.

The U-phase Hall output u amplified by amplifier 6 is supplied as an input to sample-and-hold circuit 5. In sample-and-hold circuit 5, timing is determined by the sample-andhold signal (B), and the waveforms at the positive side shown in FIG. 2(C) are sampled and held and provided as an output as the waveform shown by the symbol k in FIG. 2(D).

Figure 2:
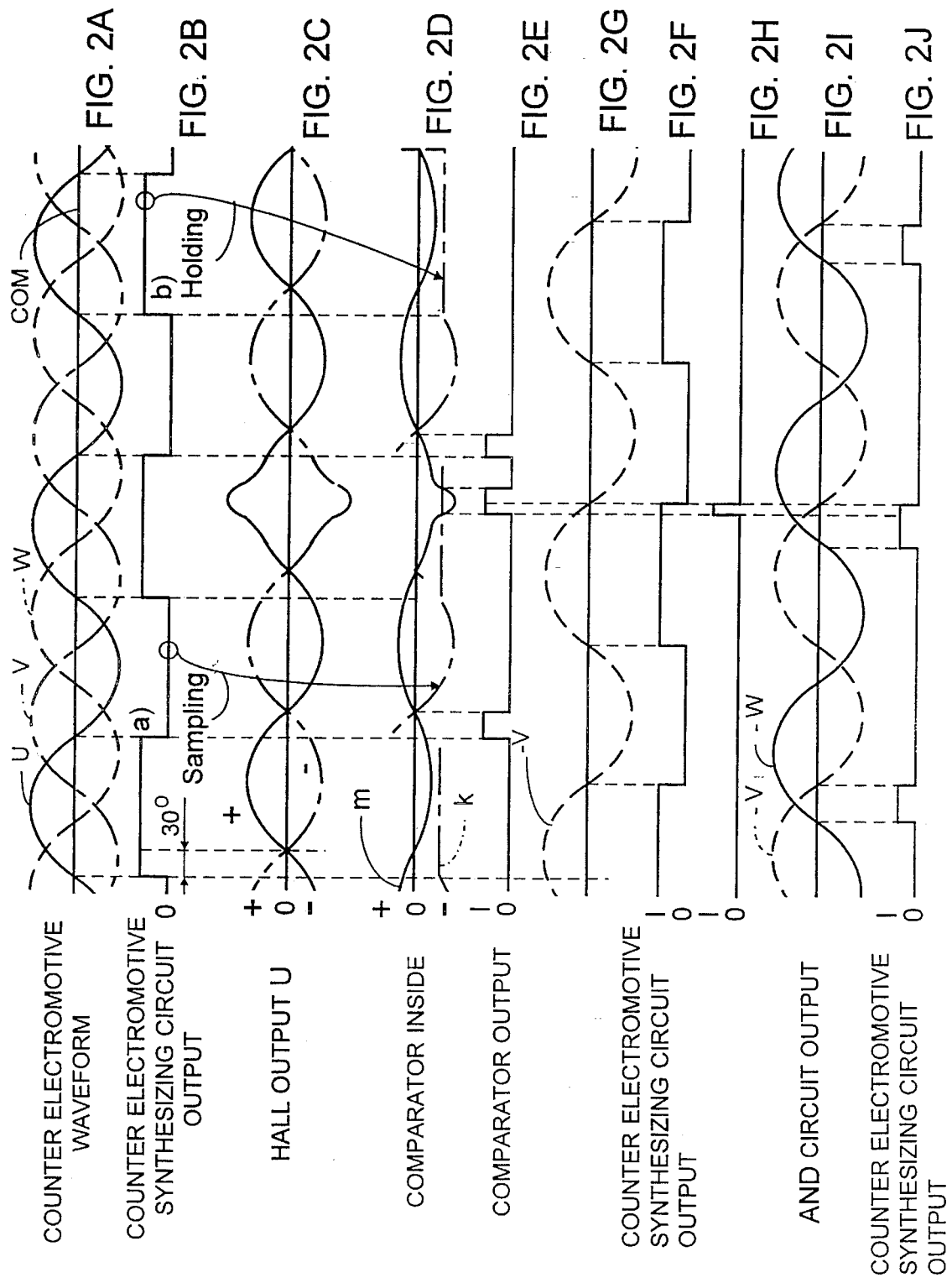
FIGS. 2(A) to 2(J) are timing charts for explaining the circuit operations of FIG. 1.

The U-phase Hall output u amplified by amplifier 6 is supplied as an input to potential dividing circuit 7. In potential dividing circuit 7, the amplitude of the waveforms at the negative side shown in FIG. 2(C) is divided by n and provided as an output as the waveform shown by the symbol m in FIG. 2 (D).

The waveform signals k and m are supplied as inputs to comparator 8. In comparator 8, voltages are compared as shown in FIG. 2(D). A high level signal is provided as an output (ON) when the wave form signal k is larger than the waveform signal m and a low level signal is provided as an output (OFF) when the waveform signal m is larger than the waveform signal k. Therefore, the pulse signal shown in FIG. 2(E) is provided as an output from comparator 8.

The pulse signal provided as an output from comparator 8 and the pulse signal provided as an output from counter electromotive synthesizing circuit 4 shown in FIG. 2(G) are supplied as inputs to AND gate 9. In AND gate 9, the logical product between the above pulse signals is computed. Thus, the pulse signal shown in FIG. 2(H) is provided as an output from AND gate 9.

By contrasting FIG. 2(C) with FIG. 2(H), it is found that the pulse signal in FIG. 2(H) coincides with the protruded portion of the U-phase Hall output u, that is, the protruded portion generated when the position detecting polarization N+ crosses Hall element 2a. Therefore, a position signal of one pulse is obtained for one turn of a motor.

In this embodiment, Hall elements 2a, 2b, and 2c serving as driving magnetic detectors are also used as position detecting magnetic detectors to obtain a signal of one pulse per turn of a motor from synthesizing means 20 by generating a rotational position signal in accordance with the synthesizing signals provided as outputs from Hall elements 2a, 2b, and 2c, the counter electromotive voltage waveform of the coil, and the coil middle-point voltage serving as a reference voltage. Therefore, the component cost can be decreased because the existing PG sensor and PG magnet are unnecessary and also the manufacturing cost can be decreased because it is unnecessary to install the PG magnet and mount the PG sensor on a board, and moreover the board can be downsized because a space for the PG sensor and a PG sensor wiring space are unnecessary.

From counter electromotive synthesizing circuit 4, the pulse position signal shown in FIG. 2(H) can also be obtained in the same way as described above by comparing and synthesizing a counter electromotive waveform whose phase deviates by approximately +90° in electrical angle from the Hall output u, that is, −V shown in FIG. 2(I), a counter electromotive waveform whose phase deviates by approximately −30° in electrical angle from the Hall output u, that is, −W shown in FIG. 2(I), and the coil middle-point voltage COM to obtain the pulse signal shown in FIG. 2(J) and using the signal instead of the pulse signal shown in FIG. 2(G).

Figure 3:
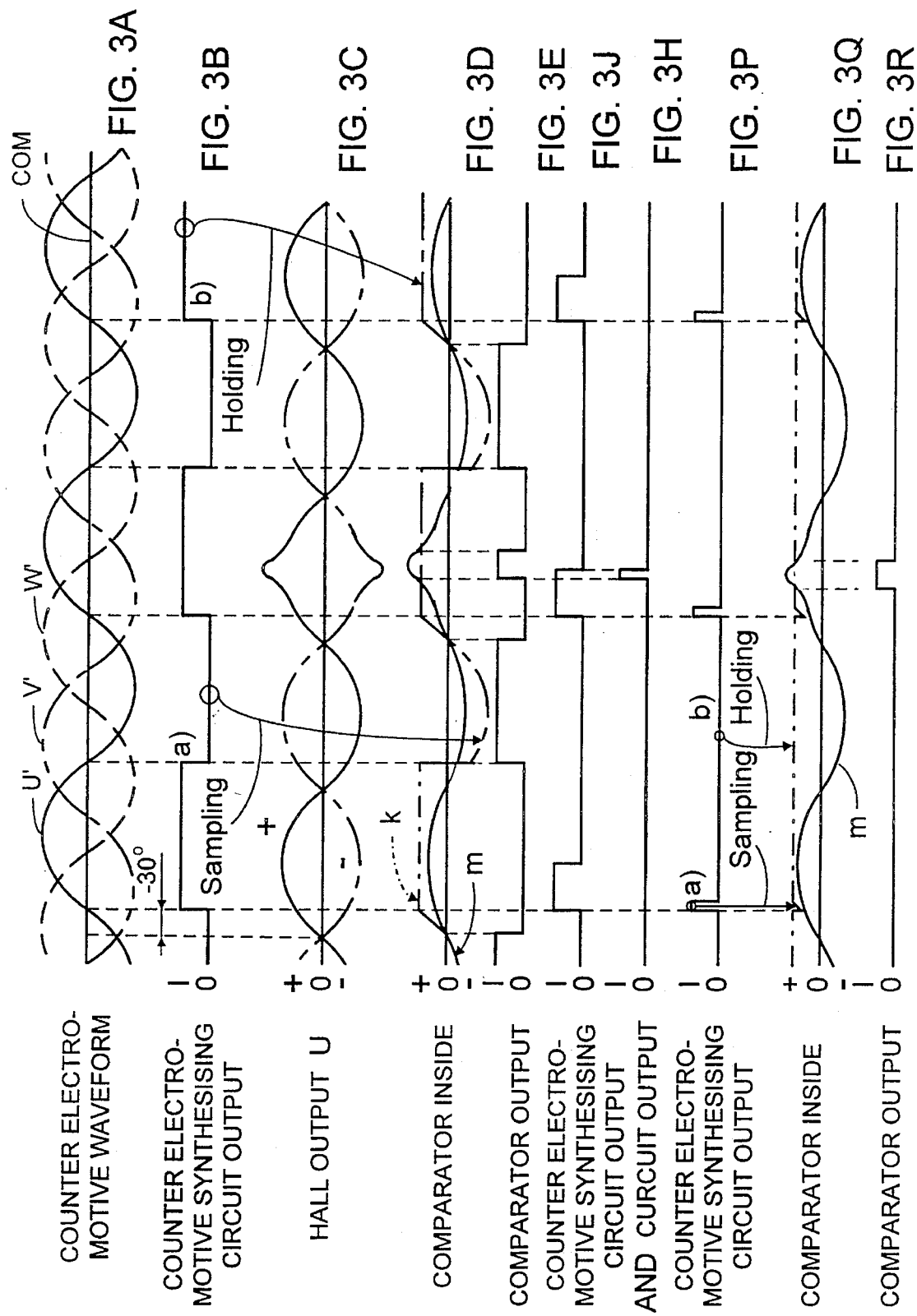
FIGS. 3(A) to 3(E), 3(J) and 3(H), and 3(P) to 3(R) are timing charts for explaining the circuit operations of a brushless-motor rotational position detector showing another embodiment of the present invention.

FIGS. 3 (A) to 3 (E), 3 (J) and 3 (H), and 3 (P) to 3 (R) are timing charts for explaining the circuit operations of a brushless-motor rotational position detector showing another embodiment of the present invention.

In this embodiment, a counter electromotive waveform U' shown in FIG. 3(A) whose phase deviates by approximately −30° in electrical angle from the Hall output u and the coil middle-point voltage COM serving as a reference voltage are compared and synthesized in counter electromotive synthesizing circuit 4, the pulsating sample-and-hold signal shown in FIG. 3(B) is provided as an output from circuit 4 to sample-and-hold circuit 5, the sample-and-hold timing in sample-and-hold circuit 5 is changed from that of the previous embodiment, the positive-side waveforms in FIG. 3(C) are sampled and held, and the waveform shown by the symbol k in FIG. 3(D) is obtained. The amplitude of the U-phase Hall output u amplified by the amplifier 6 is divided by n for the positive-side waveforms shown in FIG. 3(C) by potential dividing circuit 7 and supplied as an output as the waveform shown by the symbol m in FIG. 3(D), and voltage comparison shown in FIG. 3(D) is performed by comparator 8. Then, a high level signal is provided as an output (ON) when the waveform signal m is larger than waveform k and a low level signal is supplied as an output (OFF) when waveform signal k is larger than waveform m. Then, the pulse signal shown in FIG. 3(E) is output is supplied as an output from comparator 8, the logical product between the pulse signal in FIG. 3(E) and the signal J provided as an output from counter electromotive synthesizing circuit 4 described in the previous embodiment is computed in AND gate 9, and the pulse signal shown in FIG. 3(H), that is, a position signal which is the same as the pulse signal shown in FIG. 2(H) is obtained from AND gate 9.

Therefore, it is clear that the same advantage can be obtained as in the previous embodiment.

In this case, it is also possible to use a sample-and hold signal provided as an output from counter electromotive synthesizing circuit 4 as the pulse signal shown in FIG. 3(P) which performs sampling and holding at the cross point between the counter electromotive waveform U' and the coil middle-point voltage COM to obtain the waveform shown by the symbol n in FIG. 3(Q) by sampling and holding the U-phase Hall output waveform u by the sampie-and-hold signal, compare the voltage of the waveform n with that of the waveform m by comparator 8, output a high level Signal when waveform signal m is larger than the waveform n and output a low level signal when the waveform signal n As larger than the waveform m so as to output the pulse signal shown in FIG. 3(R), and use the pulse signal R as a rotational position signal.

Figure 4:
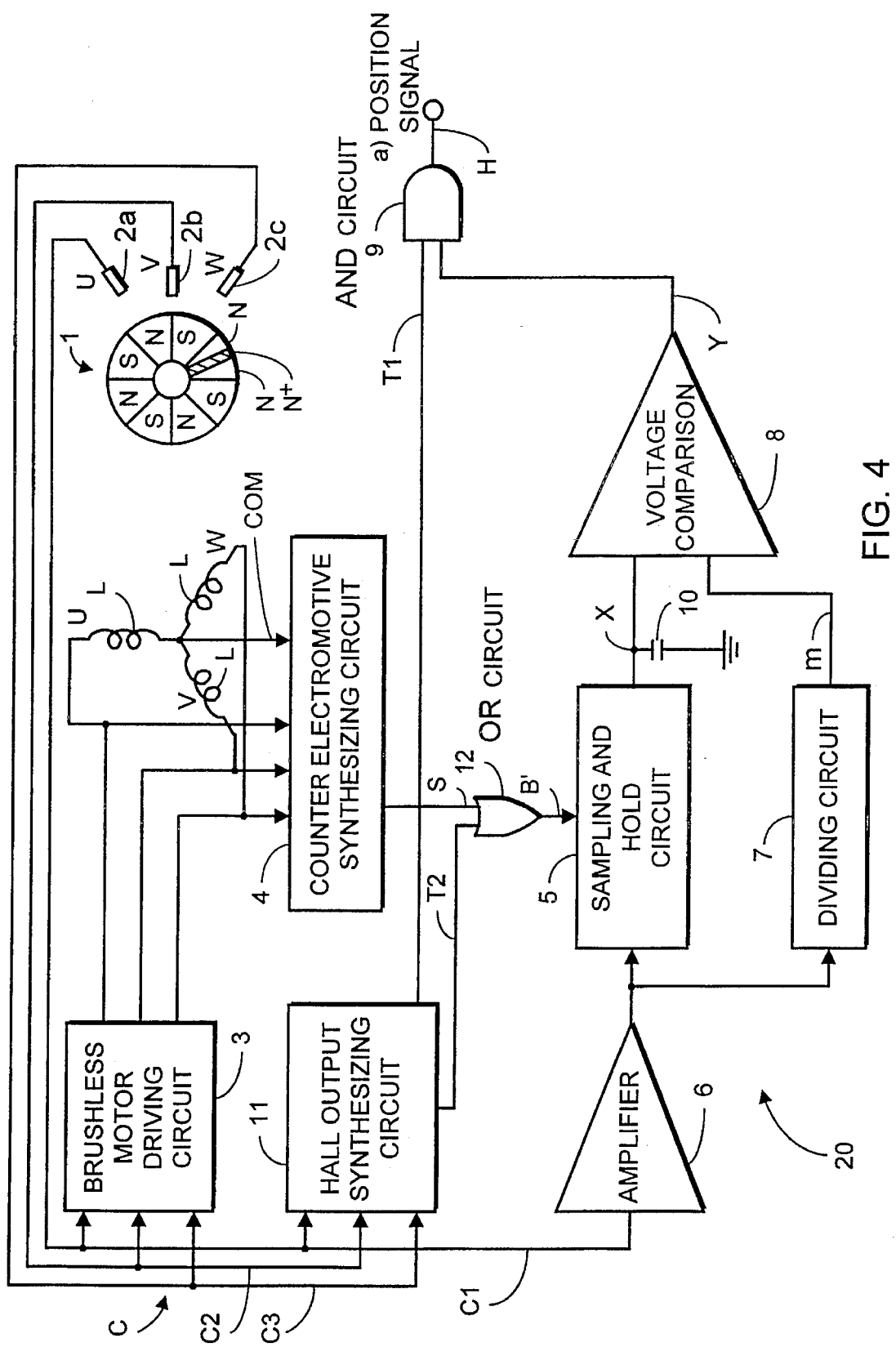
FIG. 4 is a typical diagram of a rotational position detector of a brushless motor showing still another embodiment of the present invention.

FIG. 4 is a typical diagram of a brushless rotational position detector showing still another embodiment of the present invention.

In the case of the brushless-motor rotational position detector of this embodiment, synthesizing means 20 comprises an amplifier 6 connected to one (phase U for this embodiment) of the output terminals of Hall elements 2a, 2b, and 2c to amplify an output signal of the Hall element, a counter electromotive synthesizing circuit 4 for detecting a counter electromotive waveform induced by electrifying a driving coil L and the middle-point voltage of the coil L to output a predetermined pulse signal, a Hall output synthesizing circuit 11 for comparing and synthesizing the signals provided as outputs from Hall elements 2a, 2b, and 2c to output a predetermined pulse signal, an OR circuit 12 for computing the logical sum between the output signal of the Hall output synthesizing circuit 11 and that of counter electromotive synthesizing circuit 4, a sample-and-hold circuit 5 for sampling and holding the output signal of amplifier 6 in accordance with a pulse signal provided as an output from OR circuit 12, a potential dividing circuit 7 for dividing the amplitude of the output signal of amplifier 6 by n, a comparator 8 for comparing the voltage of the output signal of sample-and-hold circuit 5 with that of the output signal of potential dividing circuit 7, and AND circuit 9 for computing the logical product between the output signal of comparator 8 and that of Hall output synthesizing circuit 11 to provide the logical product as a rotational position detection signal output. Other portions of this arrangement are the same as that of the detector shown in FIG. 1. Therefore, the description of such other portions is omitted.

The following is the description of the brushless-motor rotational position detector constituted as described above.

Also in the case of this embodiment, Hall outputs of the phases U, V, and W serve as sinusoidal waveforms having a peak once per turn of a motor as shown in FIG. 5(C) which is similar to the detector described in FIG. 1. Among these outputs, the output signal of the phase U is amplified by amplifier 6 and supplied as inputs to the sample-and-hold circuit 5 and the potential dividing circuit 7, respectively.

The sinusoidal-waveform outputs of Hall elements 2a, 2b, and 2c shown in FIG. 5(C) are supplied as inputs to a brushless-motor driving circuit 3, a driving current is supplied to driving coil L in accordance with these signals, and a driving magnet 1 rotates.

The counter electromotive waveform induced in this case and the middle-point voltage of coil L are supplied as inputs to counter electromotive synthesizing circuit 4. In counter electromotive synthesizing circuit 4, counter electromotive waveforms U, V, and W shown in FIG. 5(A) whose phases deviate by approximately +30° in electrical angle from Hall outputs u, v, and w and the coil middle-point voltage COM serving as a reference voltage are compared and synthesized and the pulsating signal shown in FIG. 5(S) is provided as an output.

Figure 5:
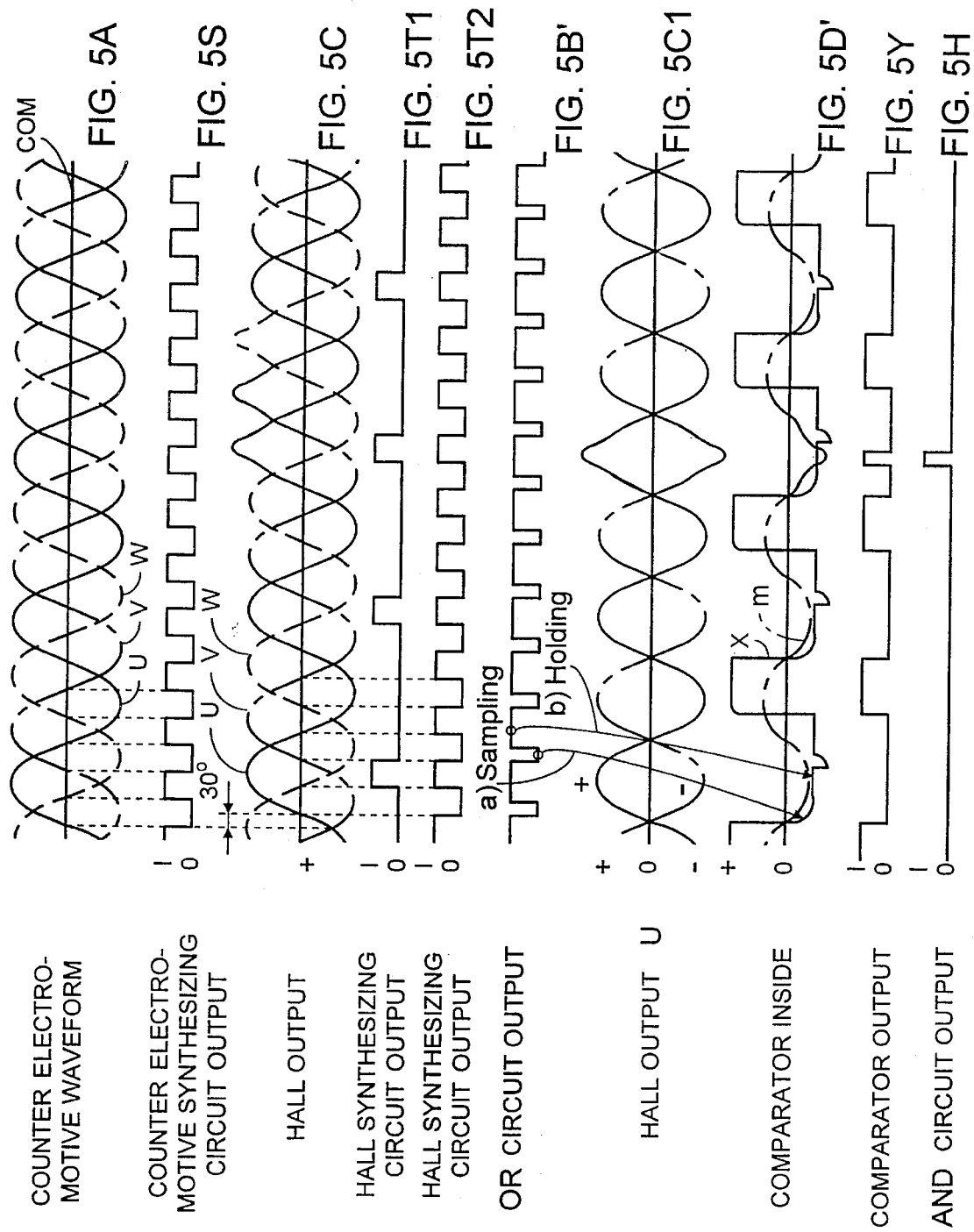
Figure 6:
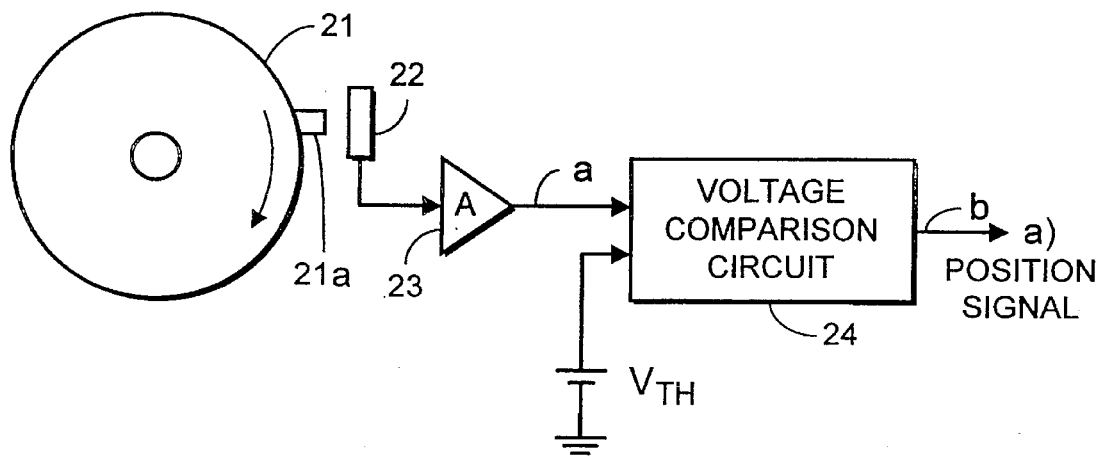
FIG. 6 is a schematic block diagram of a brushless motor rotational position detector showing the prior art.
Figure 7A:
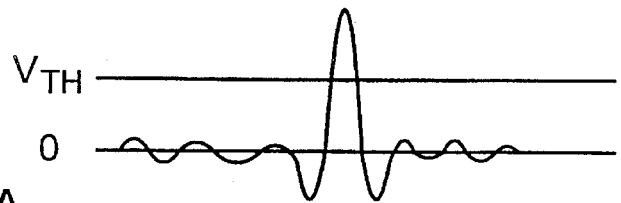
FIGS. 7(a) and 7(b) are timing charts for explaining the circuit operations of FIG. 6.
Figure 7B:

Moreover, the sinusoidal outputs of Hall elements 2a, 2b, and 2c shown in FIG. 5(C) are also supplied as inputs to a Hall output synthesizing circuit 11 where the Hall outputs u, v, and w are compared and synthesized and the pulse signal shown in FIG. 5(T2) is provided as an output. Furthermore, the Hall outputs v and w are also compared and synthesized and the pulse signal shown in FIG. 5(T1) is provided as an output.

The pulse signal shown in FIG. 5(T2) and the pulse signal shown in FIG. 5(S) provided as an output from counter electromotive synthesizing circuit 4 are supplied to OR gate 12. The logical sum between the above pulse signals is computed by OR gate 12 and the pulsating sample-and-hold signal shown in FIG. 5(B') is provided as an output from OR gate 12.

The U-phase Hall output u amplified by amplifier 6 is supplied as an output to sample-and-hold circuit 5. In sample-and-hold circuit 5, timing is determined by the sample-and-hold signal shown in FIG. 5(B') and negative-side waveforms shown in FIG. 5(C1) are sampled and held and provided as an output as the waveform shown by the symbol x in FIG. 5(D').

Meanwhile, the U-phase Hall output u amplified by the above amplifier 6, is supplied as an input in potential dividing circuit 7, and the amplitude thereof of the negative side waveform shown in FIG. 5 (C1) is divided by n in potential dividing circuit 7, to be provided as an output as a waveform of symbol m shown in FIG. 5 (D').

The waveform signals x and m are supplied as inputs to comparator 8. Voltage comparison shown in FIG. 5(D') is performed by comparator 8, a high level signal is provided as an output (ON) when waveform signal x is larger than waveform m and a low level signal is outputted (OFF) when waveform signal m is larger than waveform x, and the pulse signal shown in FIG. 5(Y) is provided as an output from comparator 8.

The pulse signal in FIG. 5(Y) and the pulse signal shown in FIG. 5(T1) provided as outputs from Hall output synthesizing circuit 11 are supplied as inputs to AND gate 9. The AND gate 9 computes the logical product between the above pulse signals and provides the pulse signal shown in FIG. 5(H) as an output.

By contrasting FIG. 5(C1) with FIG. 5(H), it is found that the pulse signal in FIG. 5(H) coincides with the protruded portion of the U-phase Hall output u, that is, the protruded portion generated when the position detecting polarization N+ crosses Hall element 2a. Therefore, a position signal of one pulse is obtained for one turn of a motor.

Therefore, it is clear that this embodiment also makes it possible to obtain the same advantage as in the previous embodiment.

Though each of the above embodiments uses the middle-point voltage of a coil as a reference voltage, the reference voltage is not restricted to the middle-point voltage. For example, it is also possible to use the middle-point voltage obtained by star-connecting resistors to a coil terminal.

Moreover, though each of the above embodiments applies N+ polarization to one of the driving magnetic poles N as position-detecting magnetic means, it is also possible to obtain the protruded portions shown in FIGS. 2(C), 3(C), and 5(C1) by forming a position-detecting projection instead of the N+ polarization and changing air gaps by the protrusion.

Furthermore, though each of the above embodiments forms position-detecting magnetic means on an N pole, it is also possible to form the means on an S pole or to form the means at two or more places.

Furthermore, though each of the above embodiments uses a U-phase output as one of the outputs of Hall elements 2a, 2b, and 2c, it is also possible to use a V– or W–phase output as one of the outputs of the Hall elements.

The different aspects of the present invention have been described above in detail in accordance with different embodiments. However, the present invention is not restricted to the above embodiments but it can variously be modified within its scope. The present invention can also be applied to, for example, a brushless motor using a driving magnetic detector other than a Hall element or a plane-opposed-type brushless motor.

What is claimed is:

1. A brushless-motor rotational position detector comprising:

an m-phase driving coil to be reciprocally electrified in positive and negative directions;

a driving magnet which faces the driving coil, having driving magnetic poles N and S alternately polarized, and which rotates together with a rotary shaft;

homopolar position-detecting magnetic means (N+) formed on at least one of the driving magnetic poles;

magnetic detectors arranged so as to face the driving magnet to detect magnetic fields of both the driving magnetic poles (N and S) and position-detecting magnetic means (N+);

a brushless motor driving circuit for supplying a driving current to said driving coil in accordance with output signals from the magnetic detectors; and synthesizing means for generating a rotational position signal by synthesizing output signals from the magnetic detectors, counter electromotive voltage waveforms (U, V and W) of the driving coil, and a reference voltage.

2. The brushless-motor rotational position detector according to claim 1, wherein the output of a magnetic detector changes once per turn.

3. The brushless-motor rotational position detector according to claim 1, wherein said synthesizing means comprises:

an amplifier for amplifying output signals for one phase among those of a magnetic detector;

a counter electromotive synthesizing circuit for providing a predetermined pulse signal as an output in accordance with a counter electromotive voltage waveform of a driving coil and a reference voltage;

a sample-and-hold circuit for sampling and holding an output signal of the amplifier in accordance with a pulse signal provided as an output from the counter electromotive synthesizing circuit;

a potential dividing circuit for dividing the amplitude of the potential of the output signal of the amplifier by n;

a comparator for voltage-comparing the output signal of the sample-and-hold circuit with that of the potential dividing circuit; and an AND circuit for computing the logical product between output signals of the comparator and the counter electromotive synthesizing circuit to provide the logical product as a rotational position detection signal output.

4. The brushless-motor rotational position detector according to claim 1, wherein said synthesizing means comprises:

an amplifier for amplifying output signals for one phase among those of a magnetic detector;

a counter electromotive synthesizing circuit for providing a predetermined pulse signal as an output in accordance with a counter electromotive voltage waveform of a driving coil and a reference voltage;

a Hall output synthesizing circuit for comparing and synthesizing signals provided as outputs from a magnetic detector to output a predetermined pulse signal;

an OR circuit for computing the logical sum between output signals of the Hall output synthesizing circuit and the counter electromotive synthesizing circuit;

a sample-and-hold circuit for sampling and holding the output signal of the amplifier in accordance with a pulse signal provided from the OR circuit as an output;

a potential dividing circuit for dividing the amplitude of the potential of the output signal of the amplifier by n;

a comparator for voltage-comparing output signals of the sample-and-hold circuit and the potential dividing circuit; and an AND circuit for computing the logical product between output signals of the comparator and the Hall output synthesizing circuit to provide the logical product as a rotational position detection signal output.

* * * * *